United States Patent
Saotome

(10) Patent No.: US 9,675,887 B2
(45) Date of Patent: Jun. 13, 2017

(54) OBJECT DISPLAY DEVICE

(71) Applicant: KABUSHIKI KAISHA SQUARE ENIX, Tokyo (JP)

(72) Inventor: Hiroaki Saotome, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 226 days.

(21) Appl. No.: 13/945,192

(22) Filed: Jul. 18, 2013

(65) Prior Publication Data

US 2014/0035933 A1 Feb. 6, 2014

(30) Foreign Application Priority Data

Aug. 1, 2012 (JP) .................. 2012-171533
Jul. 11, 2013 (JP) .................. 2013-145236

(51) Int. Cl.
   *A63F 13/57* (2014.01)
   *G06T 13/20* (2011.01)

(52) U.S. Cl.
   CPC .............. *A63F 13/57* (2014.09); *G06T 13/20* (2013.01); *A63F 2300/6607* (2013.01)

(58) Field of Classification Search
   None
   See application file for complete search history.

(56) References Cited

U.S. PATENT DOCUMENTS

| | | | |
|---|---|---|---|
| 6,317,130 B1 * | 11/2001 | Ishikawa | G06T 13/40 345/473 |
| 8,237,707 B2 | 8/2012 | Furuhashi et al. | |
| 8,432,401 B2 | 4/2013 | Mukai | |
| 8,471,850 B2 | 6/2013 | Furuhashi et al. | |
| 2005/0075557 A1 | 4/2005 | Kamiyama | |
| 2009/0027386 A1 | 1/2009 | Furuhashi et al. | |
| 2010/0097375 A1 | 4/2010 | Tadaishi et al. | |
| 2010/0134490 A1 | 6/2010 | Corazza et al. | |

(Continued)

FOREIGN PATENT DOCUMENTS

| | | |
|---|---|---|
| EP | 1505546 | 2/2005 |
| JP | 2005-056251 | 3/2005 |

(Continued)

OTHER PUBLICATIONS

Ward, Kelly, and Ming C. Lin. "Adaptive grouping and subdivision for simulating hair dynamics." Computer Graphics and Applications, 2003. Proceedings. 11th Pacific Conference on. IEEE, 2003.*

(Continued)

*Primary Examiner* — Vu Nguyen
(74) *Attorney, Agent, or Firm* — Greenblum & Bernstein, P.L.C.

(57) ABSTRACT

A polygon of a skirt is beforehand set in association with a skirt bone such that the polygon is at an angle of $\beta$ to the skirt bone. The movement of the skirt bone is controlled according to the movement of a thigh bone. When a character walks or runs, if the thigh bone is inclined at an angle of $\alpha$, each of the skirt bone and the polygon is inclined at an angle of $\alpha$ in a direction perpendicular to the ground surface. Therefore, since a polygon and the polygon do not interest each other, it is possible to prevent a thigh portion of the character from penetrating the skirt unnaturally.

14 Claims, 7 Drawing Sheets

(56) References Cited

U.S. PATENT DOCUMENTS

2011/0077078 A1* 3/2011 Taoka et al. .................... 463/31
2011/0292034 A1 12/2011 Corazza et al.
2012/0225717 A1 9/2012 Kuroda et al.

FOREIGN PATENT DOCUMENTS

JP       2010-142355     7/2010
WO      2010/060113      5/2010

OTHER PUBLICATIONS

Bender, J., K. Erleben, and E. Galin., "Adding physics to animated characters with oriented particles." (2011).*
Henrik Enqvist, "The Secrets of Cloth Simulation in Alan Wake", http://www.gamasutra.com/view/feature/4383/the_secrets_of_cloth_simulation_in_.php?print=1, May 2, 2010.*
U.S. Appl. No. 13/980,113 to Tomohiko Mukai, filed Jul. 17, 2013.
U.S. Appl. No. 13/982,850 to Tomohiko Mukai, filed Jul. 31, 2013.
U.S. Appl. No. 13/945,292 to Hiroaki Saotome, filed Jul. 18, 2013.
Extended European Search Report from European Patent Office (EPO) in European Patent Application No. 13177899.5, dated Oct. 10, 2013.
Office Action from Japanese Patent Office (JPO) in Japanese Patent Application No. 2013-145236, dated Jul. 1, 2014, along with a partial English language translation thereof.
"Lectures on MMD (MikuMikuDance)", Windows 100%, Japan, Fuyusha, Shinyusha Co., Ltd., vol. 15, No. 8, pp. 124-125 (Jul. 13, 2012).

* cited by examiner

FIG. 6

| CHARACTER NAME 51 | CHARACTER DESIGN 52 | CHARACTER POSITION 53 | SKIRT BONE CONTROL FLAG 54 |
|---|---|---|---|
| CHARACTER A | ID802 | x, y, z = −10, 25, 3 | 0 |
| CHARACTER B | ID235 | x, y, z = −11, 24, 3 | 0 |
| CHARACTER C | ID101 | x, y, z = 18, 20, 2 | 1 |
| ... | ... | ... | ... |

50

OBJECT DISPLAY DEVICE

CROSS REFERENCE TO RELATED APPLICATIONS

The present disclosure relates to subject matter contained in Japanese Patent Application No. 2012-171533, filed on Aug. 1, 2012, and Japanese Patent Application No. 2013-145236, filed on Jul. 11, 2013, the disclosure of which is expressly incorporated herein by reference in its entirety.

TECHNICAL FIELD

The present invention relates to an object display device that can realistically display an activation of an object such as a character accessory or a character hair, which is controlled through a realistic activation by performing physics calculation processing, by a small amount of calculation without an uncomfortable feeling without performing physics calculation processing.

BACKGROUND ART

In the past, in order to represent a more realistic game screen, the movement of a skirt and mantle of a character or a hair of the character is controlled by performing physics calculation considering the influence of gravity and wind. However, in the case of a game such as an MMORPG in which a plurality of characters appears in a display screen, when processing by physics calculation is applied to all of the appearing objects, the calculation amount increases and the processing load in a calculation device increases.

In order to prevent this problem, processing by physics calculation may be turned off with respect to some characters such as remote characters. However, when physics calculation is not performed simply, since an unrealistic display method is performed, for example, a portion of the leg of a character slips through a skirt, a prepared animation is used to display a behavior of the character.

However, in this case, since an animation needs to be produced with respect to each character, each accessory, or each type of character hairstyle, the animation production time and cost increase. In order to reduce the animation production cost, the types of accessories such as skirts appearing in a game should be reduced to the maximum extent. Therefore, there is a possibility that the pleasure of a player in the diversity of designs such as accessories will be reduced. In addition, when an animation is provided for each accessory, each character hairstyle and the like, the data amount for storing animations may increase.

SUMMARY OF INVENTION

A purpose of the present invention is to solve above problems, that is, to provide an object display device that can operate an object such as a character accessory or a character hair, which is realistically activated by performing physics calculation, by a small amount of calculation without an uncomfortable feeling without performing physics calculation. Another purpose of the present invention is to provide an object display device that can reduce the animation production cost and can reduce the consumption of memory capacity because an animation, which is used when control by physics calculation is turned off, need not be stored with respect to each character, each accessory, or each type of character hair style.

The present invention relates to an object display device which displays a first object and a second object and in which positions of polygons are set in association with each of a position of a first skeleton of the first object and a position of a second skeleton of the second object, the object display device comprising: a first skeleton activator that activates the first skeleton; a second skeleton activator that activates the second skeleton according to an activation of the first skeleton activated by the first skeleton activator; a position calculator that calculates a position of the polygon based on the position of the first skeleton and the position of the second skeleton; and an object displayer that displays the first object and the second object on a display screen by drawing the polygon at the position calculated by the position calculator.

For example, when a character (including not only a player character but also a non-player character) in a virtual space wears a skirt, polygons are stored in association with a thigh bone that is a skeleton (a first skeleton) of a thigh portion of the character and a skirt bone that is a skeleton (a second skeleton) of the skirt. Thus, by performing modeling based on the position of the thigh bone and the position of the skirt bone, the thigh portion of the character is drawn and displayed. In the present invention, the skirt bone activates according to the activation of the thigh bone. That is, when the thigh bone is inclined with respect to the ground surface, the skirt bone is inclined to the extent of the inclination of the thigh bone, therefore the leg of the character does not slip through the skirt.

Also, since physics calculation need not be performed, the movement of the skirt or the hair can be controlled by a small amount of calculation without an uncomfortable feeling. Also, an animation need not be prepared for each character, each accessory, or each type of character hair, the animation production cost can be reduced. Also, since the load on memory capacity can be reduced, the designs of accessories can be diversified. Particularly, in a game such as an MMORPG in which many persons participate simultaneously, it is generally required to diversify the design of a player character. Therefore, the present invention can be suitably applied to such a game in which many persons participate.

In the present invention, it is preferable that the first skeleton and the second skeleton are set to be substantially parallel to each other, a position of a first polygon associated with the position of the first skeleton is set to be at a position that is substantially parallel to the first skeleton, and a position of a second polygon associated with the position of the second skeleton is set to be at a position that is at a predetermined angle to the second skeleton.

Since the thigh bone and the skirt bone are set to be substantially parallel to each other, the movement of the skirt bone can be controlled by a small amount of calculation according to the movement of the thigh bone. Also, since the skirt bone is at a predetermined angle to the position of a polygon constituting the skirt, the skirt can be displayed without an uncomfortable feeling even when the skirt bone is set to be substantially parallel to the thigh bone.

In the present invention, it is preferable that the object display device further comprising: an activation method switcher that switches an activation method of activating the second skeleton by the second skeleton activator when a predetermined condition is satisfied, wherein when the activation method of the second skeleton is switched by the activation method switcher, the second skeleton activator activates the second skeleton by physics calculation processing regardless of the activation of the first skeleton activated by the first skeleton activator.

The present invention can display the movement of an accessory such as a skirt or a mantle and the movement of hair without an uncomfortable feeling even without performing physics calculation. However, the present invention can control an accessory or the like by physics calculation with respect to an own player character operated by the player himself, a character near to the own player character, or a character important in game progression. For example, the movement of an accessory or the like is controlled by physics calculation with respect to an own player character operated by the player himself, a character located within a predetermined distance from the own player character, or other player character that is a companion of the own player character. The processing by physics calculation and the processing based on the activation of the first skeleton can be switched according to a predetermined condition.

The present invention relates to a tangible computer readable medium that stores an object display program which executes a computer apparatus to display a first object and a second object and in which positions of polygons are set in association with each of a position of a first skeleton of the first object and a position of a second skeleton of the second object, the object display program causing the computer apparatus to function as: a first skeleton activator that activates the first skeleton; a second skeleton activator that activates the second skeleton according to an activation of the first skeleton activated by the first skeleton activator; a position calculator that calculates a position of the polygon based on the position of the first skeleton and the position of the second skeleton; and an object displayer that displays the first object and the second object on a display screen by drawing the polygon at the position calculated by the position calculator.

The present invention relates to an object display method which executes a computer apparatus to display a first object and a second object and in which positions of polygons are set in association with each of a position of a first skeleton of the first object and a position of a second skeleton of the second object, the object display method comprising: activating the first skeleton; activating the second skeleton according to an activation of the first skeleton activated; calculating a position of a polygon based on the position of the first skeleton and the position of the second skeleton; and displaying the first object and the second object on a display screen by drawing the polygon at the position calculated.

The present invention relates to an object display system in which an operable object is allocated to each of object display devices that are connectable to each other, the object includes a first object and a second object, and positions of polygons are set in association with each of a position of a first skeleton of the first object and a position of a second skeleton of the second object, the object display system comprising: other object display device comprising: an operation information acceptor that accepts other object operation information allocated to the other object display device; and an operation information transmitter that transmits the operation information accepted by the operation information acceptor; and an own object display device comprising: an operation information receiver that receives the operation information from the other object display device; a first skeleton activator that activates the first skeleton of the other object according to the operation information received by the operation information receiver; a second skeleton activator that activates the second skeleton of the other object according to an activation of the first skeleton activated by the first skeleton activator; a position calculator that calculates a position of the polygon of the other object based on the position of the first skeleton and the position of the second skeleton; and an object displayer that displays the first object and the second object on a display screen by drawing the polygon at the position calculated by the position calculator.

The present invention can be applied not only to the case where a player performs a single play in a stationary game apparatus or in a portable game apparatus, but also to the case where a player performs a network game through communication. Among them, the present invention can be effectively utilized in a network game such as an MMORPG in which a plurality of characters appears on a game screen. Particularly, in the case of a network game in which CG assets necessary for drawing are sequentially downloaded, by applying the present invention, the game is hardly affected by a network delay.

BRIEF DESCRIPTION OF DRAWINGS

FIG. 6 is a diagram illustrating a character management table according to an embodiment of the present invention.

DESCRIPTION OF EMBODIMENTS

Figure 1:
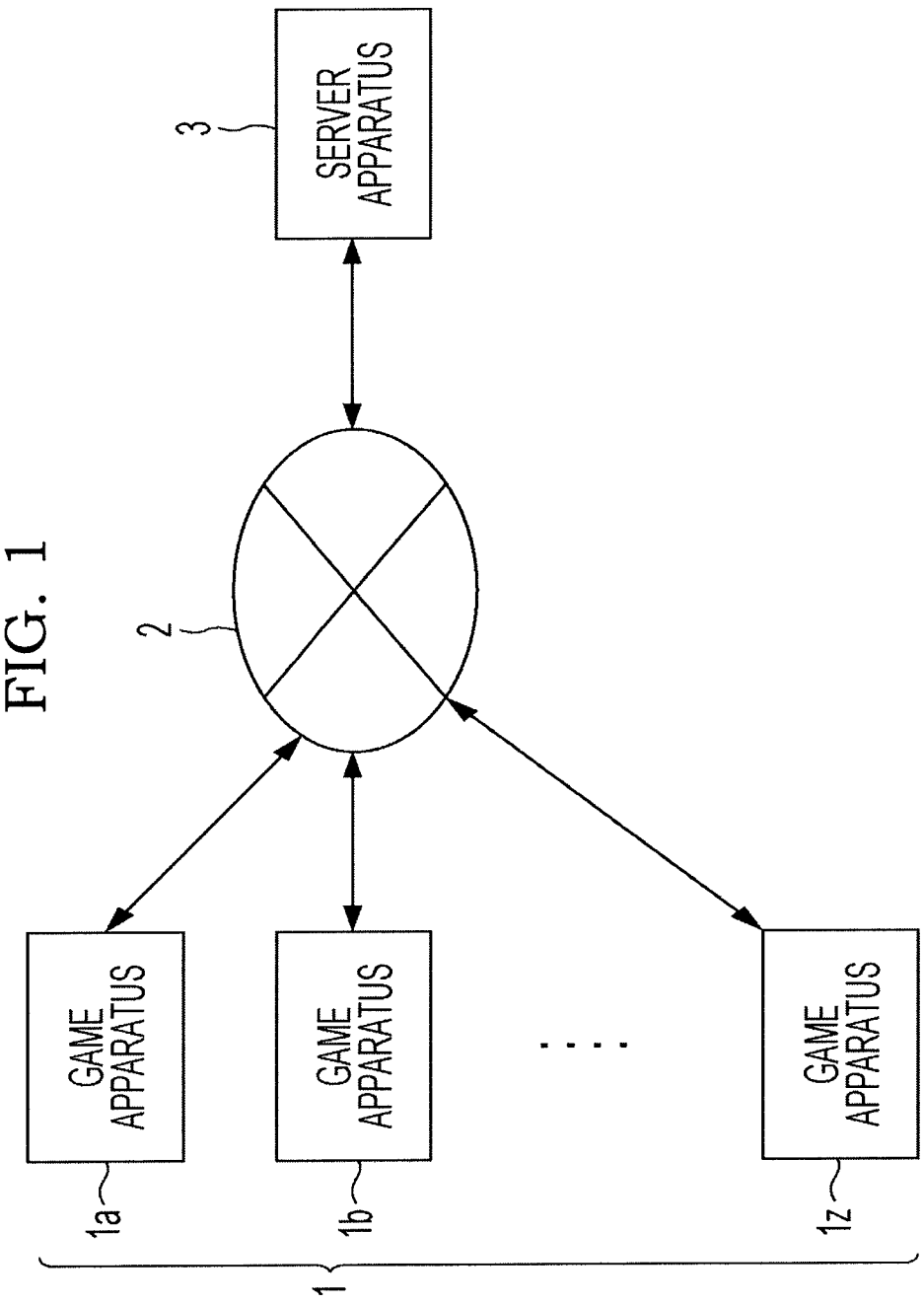
FIG. 1 is a block diagram illustrating a configuration of a game system according to an embodiment of the present invention.

Hereinafter, embodiments of the present invention will be described with reference to the accompanying drawings. In the present embodiment, the case of applying the present invention to an MMORPG is mainly described as an example. FIG. 1 is a block diagram illustrating a configuration of a game system according to an embodiment of the present invention. As illustrated in FIG. 1, the game system includes a plurality of game apparatuses 1 (game apparatuses 1a, 1b . . . 1z) operated by a plurality of players A, B . . . Z), a server apparatus 3, and a communication network 2. The game apparatuses 1 are connected to the server apparatus 3 through the communication network 2. In addition, the game apparatuses 1 need not be always connected to the server apparatus 3, and may be connected on an as-needed basis. The game apparatuses 1a to 1z are connected to the server apparatus 3, and the players may play the same game by operating a player character allocated to each of the game apparatuses 1.

Generally, in an MMORPG, at least one player character is allocated to each of the game apparatuses 1, and the player controls actions of the player character, such as a movement and an attack, by operating each game apparatus 1. For example, in the case where a player character A allocated to the game apparatus 1a and a player character B allocated to the game apparatus 1b are located within a short distance in a virtual world in a game, when an operation instruction to the player character B is input from the game apparatus 1b, operation instruction information of the player character B is transmitted from the game apparatus 1b to the game apparatus 1a through the server apparatus 3. The game apparatus 1a receives information necessary for game progression, including the operation information of the player character B, from the server apparatus 3, and progresses a game based on the information received from the server apparatus 3 and the operation instruction information input to the game apparatus 1a. An aspect of the virtual world changed by the game progression is perspectively transformed on a virtual screen and is displayed on a display screen of the game apparatus 1a.

Figure 2:
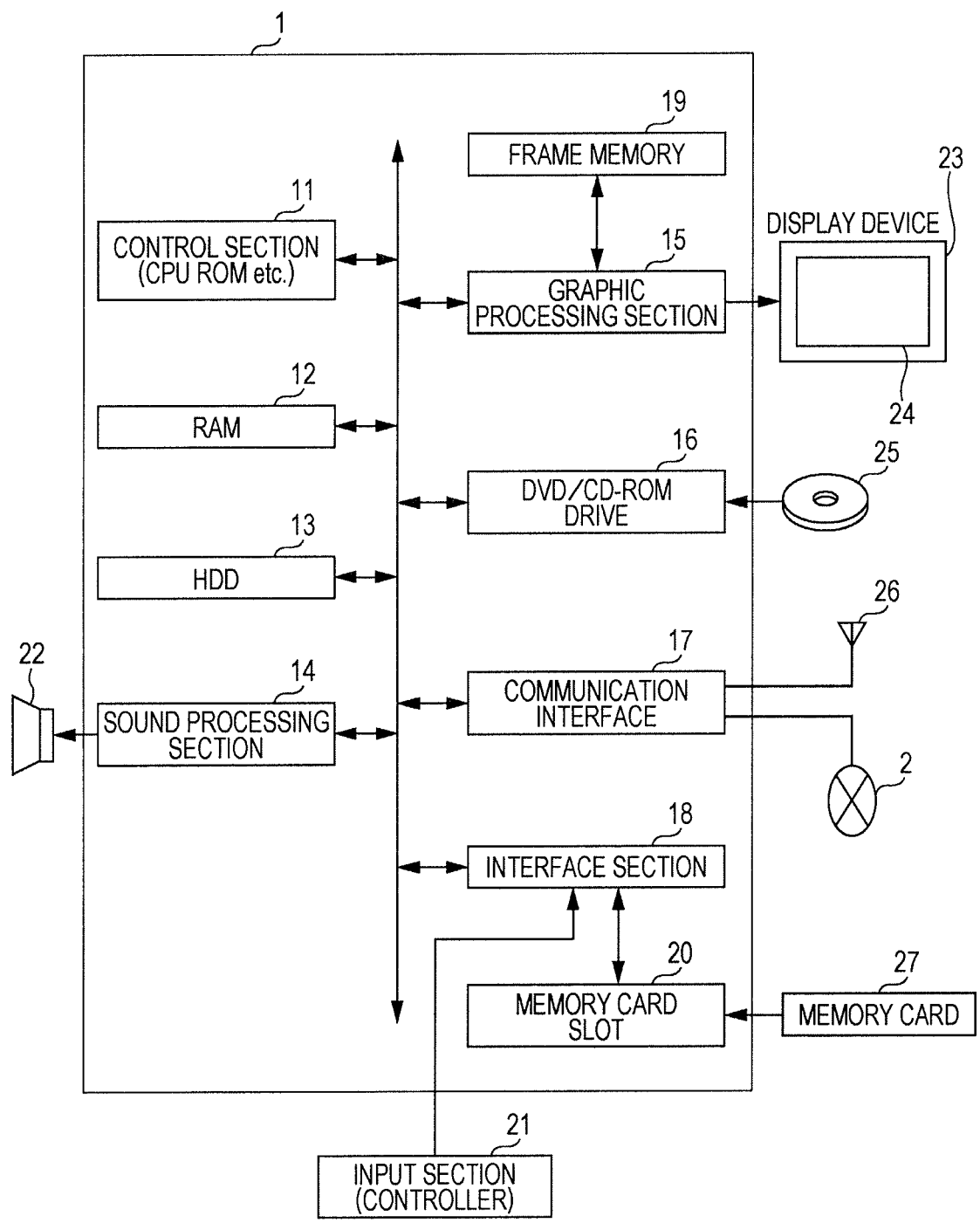
FIG. 2 is a block diagram illustrating a configuration of a game apparatus according to an embodiment of the present invention.

FIG. 2 is a block diagram illustrating a configuration of a game apparatus according to an embodiment of the present invention. A game apparatus 1 includes a control section 11, a random access memory (RAM) 12, a hard disk drive (HDD) 13, a sound processing section 14, a graphic processing section 15, a DVD/CD-ROM drive 16, a communication interface 17, and an interface section 18, which are connected to one another via an internal bus.

The control section 11 includes a central processing unit (CPU) and a read only memory (ROM). The control section 11 executes a program stored in the HDD 13 or a storage medium 25, to control the game apparatus 1. Also, the control section 11 includes an internal timer that counts time. The RAM 12 is a work area of the control section 11. The HDD 13 is a storage region for storing programs and data.

The DVD/CD-ROM drive 16 may mount the storage medium 25 storing a game program, such as a DVD-ROM or a CD-ROM. The storage medium 25 stores a program and data for performing a game. A program and data necessary to progress a game are read from the storage medium 25 by the DVD/CD-ROM drive 16 and are loaded into the RAM 12.

The control section 11 reads the program and data necessary to progress a game from the RAM 12, and performs processing thereof. By processing the program and data loaded into the RAM 12, the control section 11 outputs a sound output instruction to the sound processing section 14 and outputs a drawing command to the graphic processing section 15.

The sound processing section 14 is connected to a sound output device 22 that is a speaker. When the control section 11 outputs a sound output instruction to the sound processing section 14, the sound processing section 14 outputs a sound signal to the sound output device 22.

The graphic processing section 15 is connected to a display device 23. The display device 23 includes a display screen 24. When the control section 11 outputs a drawing command to the graphic processing section 15, the graphic processing section 15 develops an image in a frame memory (frame buffer) 19 and outputs a video signal for displaying an image on the display screen 24. The graphic processing section 15 executes drawing of one image in units of frames. A one-frame time of the image is, for example, 1/30 second.

An input section (controller) 21 and a memory card slot 20 are connected to the interface section 18. Input information from the input section 21 by a player is stored in the RAM 12, and the control section 11 executes a variety of calculation processing based on the input information. Also, according to an instruction from the control section 11, the interface section 18 performs processing for storing data about a game progression status stored in the RAM 12 in a memory card 27, and processing for reading data stored in the memory card 27 and transmitting the data to the RAM 12.

The communication interface 17 is connected to a communication network 2 in a wireless or wired manner, and communicates operation instruction information and information about a game progression status with the server apparatus 3 on an as-needed basis. Also, the communication interface 17 may perform wireless communication with another game apparatus 1 through a communication unit having an antenna 26.

Figure 3:
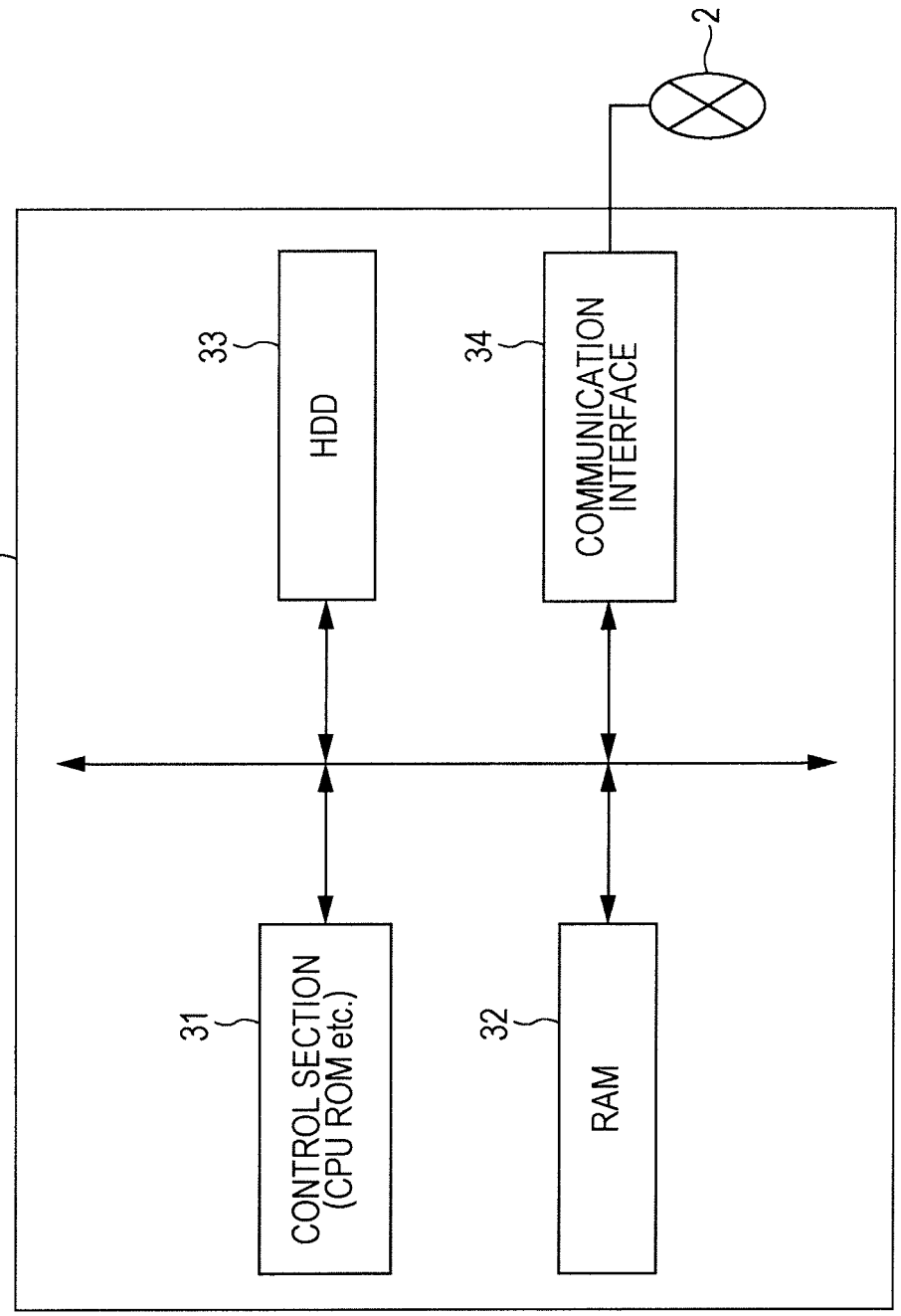
FIG. 3 is a block diagram illustrating a configuration of a server apparatus according to an embodiment of the present invention.

FIG. 3 is a block diagram illustrating a configuration of a server apparatus according to an embodiment of the present invention. The server apparatus 3 includes a control section 31, a RAM 32, a HDD 33, and a communication interface 34, each of which is connected by an internal bus.

The control section 31 includes a CPU and a ROM. The control section 31 controls the server apparatus 3 by executing a program stored in the HDD 33. Also, the control section 31 includes an internal timer that counts time. The RAM 32 is a work area of the control section 31. The HDD 33 is a storage region for storing programs and data. The control section 31 reads a program and data, which are necessary to progress a game, from the RAM 32, and performs game progression processing based on operation instruction information received from the game apparatus 1.

Next, the summary of object display processing according to the present invention will be described. An object as an application target of the present invention is a human-type character, a robot-type character, or an animal-type character, and may be any other objects. In the case of a character displayed on a game screen, the character may be an application target of the object display processing of the present invention. Therefore, the character may be not only a player character that is operated by the player, but also a non-player character that is not operated by the player. Also, when the present invention is applied to a network game, it is applied not only to an own player character that is operated in the game apparatus displaying the game screen, but also to other player character that is operated in the other game apparatus.

The object as an application target of the present invention will be described in more detail. For example, as a character and an object partially connected to the character, the object that is easily affected by wind and gravity and is generally physically calculated becomes an application target of the object display processing of the present invention. The object partially connected to the character corresponds to a region of the character such as hair (for example, rear hair), or a wearing article of the character, which has a thin cloth-type portion, such as a skirt or a mantle.

Figure 4A:
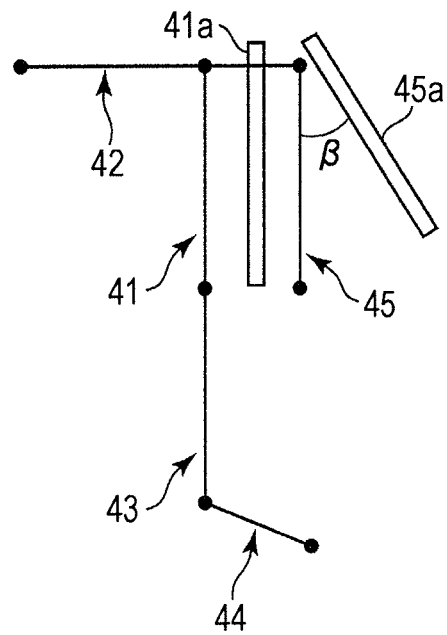
FIGS. 4A and 4B are diagrams illustrating examples of the relation between a polygon and a virtual skeleton around a thigh portion of a character.
Figure 4B:
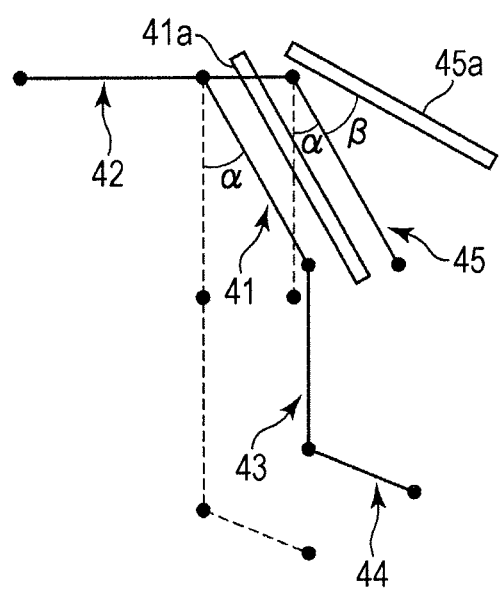

Hereinafter, the case of applying the present invention to a skirt worn by the character will be mainly described. FIGS. 4A and 4B are diagrams illustrating examples of the relation between a polygon and a virtual skeleton around a thigh portion of a character. Black circles in FIGS. 4A and 4B represent joint points of bones. FIG. 4A illustrates the relation between a virtual skeleton and a polygon in the case where the character stand straight on the ground surface, in which a thigh bone 41 corresponding to a thigh portion of the character is set to be perpendicular to the ground. The thigh bone 41 is connected to a pelvis 42 at an upper joint point, and is connected to a shinbone 43 at a lower joint point. In addition, the shinbone 43 is connected to the thigh bone 41 at an upper joint point, and is connected to a foot bone 44 at a lower joint point.

A polygon 41*a* of a thigh portion is set in association with the thigh bone 41 such that the polygon 41*a* is substantially parallel to the thigh bone 41 (substantially parallel to a line connecting the joint points of the thigh bone). Thus, the position of the polygon 41*a* changes according to the movement of the thigh bone 41. For example, as illustrated in FIG. 4B, when the character walks or runs, if the thigh bone 41 is inclined at an angle of α in a direction perpendicular to the ground surface, the polygon 41*a* is also inclined at an angle of α in comparison with the case of straight standing. In addition, although not specifically illustrated, as in the thigh bone 41, the position of a polygon may also be set in association with each skeleton of the shinbone 43 or the foot bone 44.

A skirt bone 45 is set to be substantially parallel such that the axis direction of the skirt bone 45 is equal to the axis direction of the thigh bone 41. When the character is in a straight standing state, the skirt bone 45 is set to be perpendicular to the ground surface as illustrated in FIG. 4A. In general, the skirt bone 45 is set along the inclination of the side surface of the skirt from a waist portion to a hemline portion of the skirt. However, in the present invention, by setting the skirt bone 45 to be substantially parallel to the thigh bone 41, the movement of the skirt bone 45 can be controlled according to the movement of the thigh bone 41 without performing complex calculation. In addition, the skirt bone 45 may be connected to the skeleton constituting the character at the upper joint point, and the skirt bone 45 and the thigh bone 41 may be set at the same position. Also, the skirt bone 45 may not necessarily have the same length as the thigh bone 41, and the length of the skirt bone 45 may be changed appropriately.

A polygon 45*a* of the skirt is set in association with the skirt bone 45 such that the polygon 45*a* is at an angle of β to the skirt bone 45. Thus, the position of the polygon 45*a* also changes according to the movement of the skirt bone 45. The movement of the skirt bone 45 is controlled according to the movement of the thigh bone 41 (hereinafter, referred to as control by matrix copy). The axis direction of the thigh bone 41 is copied in the axis direction of the skirt bone. Therefore, even when the thigh bone 41 is moved, the position relation between the skirt bone 45 and the thigh bone 41 is maintained such that the skirt bone 45 and the thigh bone 41 is substantially parallel to each other.

The matrix copy will be described below. For example, when a matrix representing coordinates after the movement of an end portion of the thigh bone 41 is obtained by multiplying a matrix representing coordinates before the movement of the end portion of the thigh bone 41 by a transfer matrix representing the movement amount and direction of the end portion of the thigh bone 41, a matrix representing coordinates after the movement of an end portion of the skirt bone 45 can be obtained by multiplying a matrix representing coordinates before the movement of the end portion of the skirt bone 45 corresponding to the end portion of the thigh bone 41 by the transfer matrix. From the result, the coordinates after the movement of the end portion of the skirt bone 45 can be specified. In addition, a different transfer matrix may be used for each of both end portions of the thigh bone 41. A method of controlling the coordinates after the movement of the skirt bone 45 by copying the transfer matrix representing the movement amount and direction of the thigh bone 41 as the transfer matrix of the skirt bone 45 will be referred to as control by matrix copy.

As illustrated in FIG. 4B, when the character walks or runs, if the thigh bone 41 is inclined at an angle of α in a direction perpendicular to the ground surface, the skirt bone 45 is also inclined at an angle of α in comparison with the case where the character stands straight (shown in broken line in FIG. 4B). When the skirt bone 45 is inclined at an angle of a, the polygon 45*a* is also inclined at an angle of α while maintaining an angle of β with respect to the skirt bone 45. Thus, by maintaining the position relation between the skirt bone 45 and the thigh bone 41, since the polygon 41*a* and the polygon 45*a* do not intersect each other, it is possible to prevent the thigh portion of the character from penetrating the skirt unnaturally.

In addition, although not illustrated in FIGS. 4A and 4B, a skirt bone A substantially parallel to the shinbone 43 in terms of the axis direction may be further connected to the lower joint point of the skirt bone 45. By connecting with the skirt bone 45, the skirt bone A moves according to the movement of the shinbone 43, and maintains a substantially parallel position relation with the shinbone 43. Since a polygon A connected to the bottom of the polygon 45*a* is set in association with the skirt bone A, it is possible to prevent the shin portion of the character from penetrating the skirt unnaturally. Thus, in the present invention, the direction of the skeleton of the thigh portion can be copied as the skeleton of the skirt bone, and control by matrix copy can be performed between a plurality of skeletons.

Figure 5:
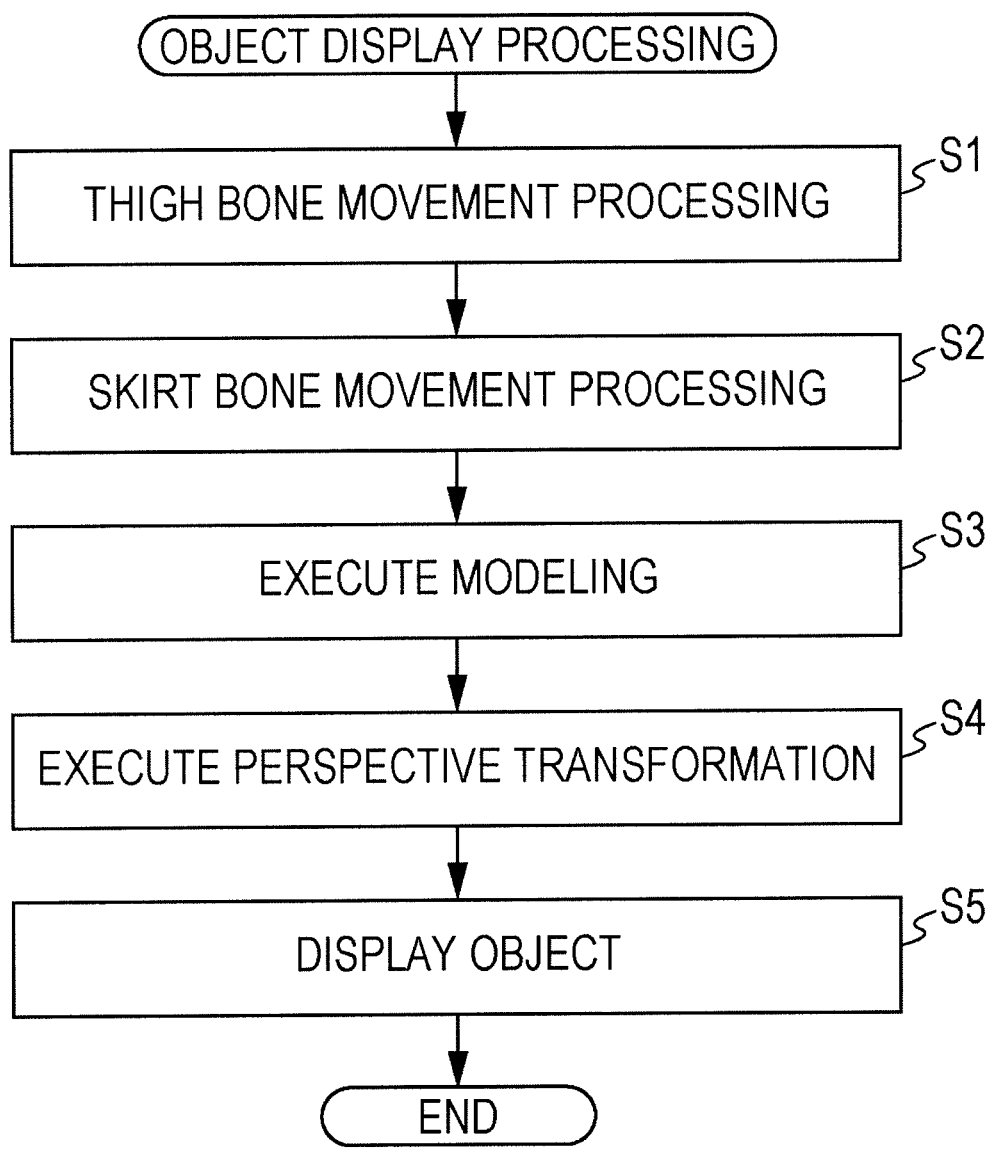
FIG. 5 is a diagram illustrating a flowchart of object display processing according to an embodiment of the present invention.

FIG. 5 is a diagram illustrating a flowchart of object display processing according to an embodiment of the present invention. First, movement processing of the thigh bone 41 is executed (step S1). For example, according to an operation instruction to the input section 21 of the game apparatus 1, by generating an action such as walking and running of the player character, the thigh bone 41 moves. Subsequently, the skirt bone 45 moves while maintaining the substantially parallel state with the thigh bone 41 (step S2). Specifically, the lower joint point moves while the upper joint point is fixed.

After executing the movement processing of the skirt bone 45 in step S2, the position of the polygon 45*a* corresponding to the skirt bone 45 is specified and modeling is executed (step S3). The position relation between the polygon 45*a* and the skirt bone 45 is predetermined, and the position of the polygon 45*a* is also decided unambiguously when the position of the skirt bone 45 is specified.

A game screen is drawn by performing perspective transformation on a virtual screen based on the shape of the character obtained by the modeling of step S3 (step S4), and the object display processing is terminated by displaying the game screen on the display screen 24 (step S5). The processing of steps S1 to S5 is executed in each frame.

Next, a character management table set in the RAM 12 of the game apparatus 1 will be described. FIG. 6 is a diagram illustrating a character management table according to an embodiment of the present invention. A character management table 50 is configured to manage information about a player character operated in other game apparatus (hereinafter, referred to as other character), in addition to a player character operated in the own game apparatus 1 (hereinafter, referred to as own character).

The character management table 50 stores information such as a character name 51, a character design 52, a character position 53, and a skirt bone control flag 54. In the present invention, the movement of the skirt bone 45 can be controlled while maintaining the substantially parallel state between the skirt bone 45 and the thigh bone 41 without performing physics calculation, the movement of the skirt bone 45 can be controlled by performing physics calculation, and a method of controlling the movement of the skirt with respect to each character can be switched. The skirt bone control flag 54 specifies one of these control methods. When control of the skirt bone 45 by physics calculation is turned off, the skirt bone control flag 54 is set, the substantially parallel state between the skirt bone 45 and the thigh bone 41 is maintained, and the movement of the skirt bone 45 is controlled.

The condition for setting the skirt bone control flag 54 may be determined appropriately. For example, when the other character is located at a predetermined distance or more (for example, 30 m or more) from the own character, the skirt bone control flag 54 may be set; and when the other character is located within a predetermined distance (for example, less than 30 m) from the own character, the skirt bone control flag 54 may be reset. Also, when the load on the control section 11 is equal to or more than a predetermined level due to the dense population of characters, the skirt bone control flag 54 may be reset according to the predetermined priority order. As the priority order, the own character has the highest priority order, a companion character of the same party as the own character has the second highest priority order, and other character than the companion character have lower priority orders. That is, the skirt bone control flag 54 is first set to the other character other than the companion character, and then the skirt bone control flag 54 is set to the companion character.

Next, the switch processing of an object display method (character display method) executed in the game apparatus 1 will be described. Herein, the case where the skirt bone control flag 54 is set when the other character is located at a predetermined distance or more from the own character; and the skirt bone control flag 54 is reset when the other character is located within a predetermined distance from the own character will be described.

Figure 7:
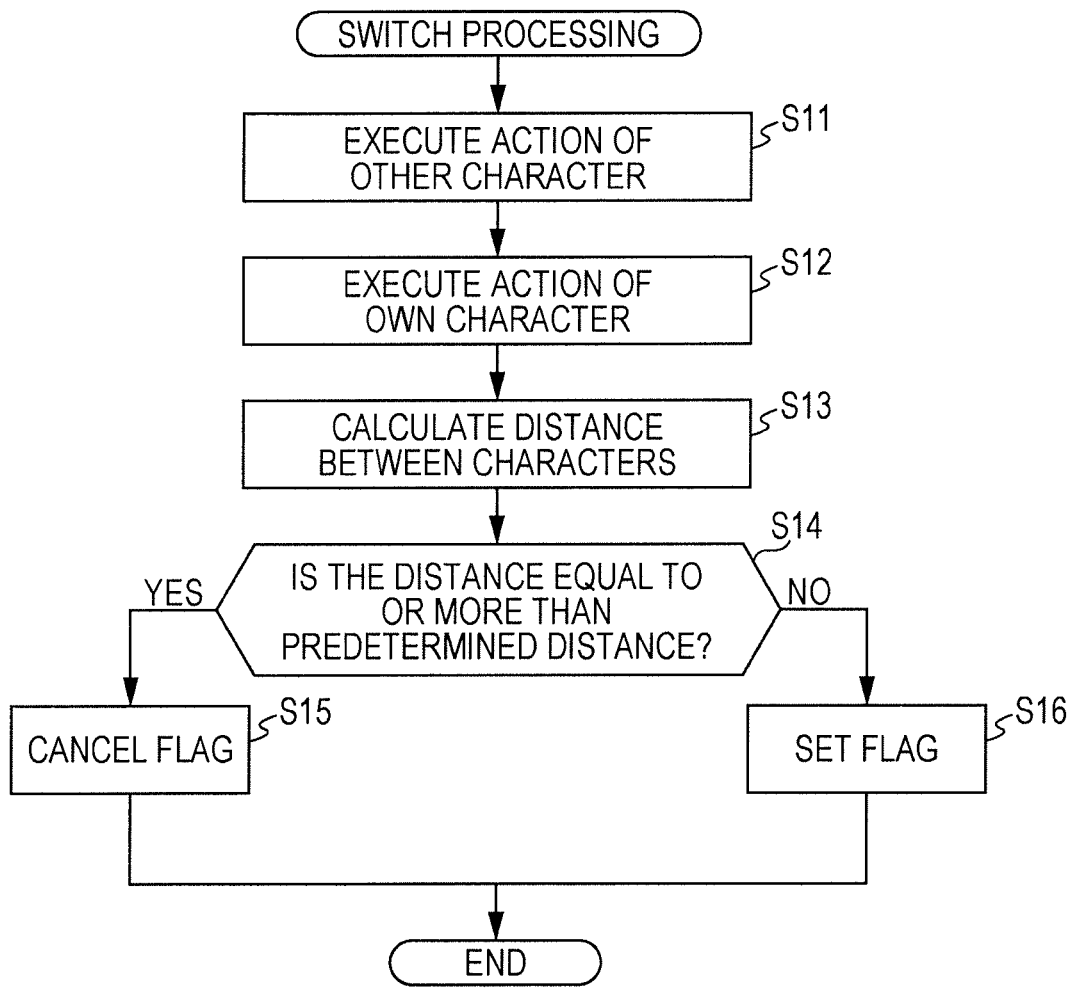
FIG. 7 is a diagram illustrating a flowchart of operation method switch processing according to an embodiment of the present invention.

FIG. 7 is a diagram illustrating a flowchart of character display switch processing according to an embodiment of the present invention. The game apparatus 1a receives information about an operation instruction of the other character input from the game apparatus 1b through the server apparatus 3, and an action other than the movement of the other character is executed (step S11). Subsequently, an action other than the movement of the own character is executed according to the operation instruction of the own character input from the input section 21 of the game apparatus 1a (step S12).

Next, the distance between the own character and the other character is calculated (step S13). When the distance between the own character and the other character calculated in step S13 is equal to or more than a predetermined distance (YES in step S14), the setting of the skirt bone control flag 54 in the character management table 50 is reset (step S15), and control by physics calculation is switched to control by matrix copy with respect to the skirt worn by the character. When the setting of the skirt bone control flag 54 is already reset, the resetting is maintained.

On the other hand, when the distance between the own character and the other character is less than a predetermined distance (NO in step S14), the skirt bone control flag 54 of the character management table 50 is set (step S16), and control by matrix copy is switched to control by physics calculation with respect to the skirt worn by the character. When the skirt bone control flag 54 is already set, the setting is maintained. The processing of steps S11 to S16 is performed in each frame.

In addition, when a behavior of the skirt worn by the character is controlled by physics calculation, a collision determination between the polygon associated with the thigh bone and the polygon associated with the skirt bone is performed. When a collision occurs, by correcting the position of the skirt bone, it is possible to prevent the leg from penetrating the skirt unnaturally. Also, by making a configuration for changing the movable range of the skirt bone according to the position of the thigh bone so that the polygon associated with the thigh bone does not intersect the polygon associated with the skirt bone, it is possible to prevent the leg from penetrating the skirt unnaturally.

In the above embodiment, the behavior of the accessory of the character and the like is controlled by physics calculation or by matrix copy, depending on the distance between the own character and the other character. However, the behavior of the accessory of the character and the like may be controlled by physics calculation or by matrix copy, depending on the number of characters displayed on the display screen. In this case, when the number of characters displayed on the display screen is smaller than a predetermined number, the behavior of the accessory of the character and the like is controlled by physics calculation; and when the number of characters displayed on the display screen is larger than a predetermined number, the behavior of the accessory of the character and the like is controlled by matrix copy.

The present invention activates a second skeleton of a second object according to an activation of a first skeleton of a first skeleton. In the above embodiment, the case of operating the skirt bone according to the operation of the thigh bone has been mainly described as an example. However, the first skeleton and the second skeleton are not necessarily connected to each other, or the second skeleton is not necessarily located near the first skeleton. The first skeleton and the second skeleton may be connected indirectly through other skeleton, or the second skeleton may be remote from the first skeleton. For example, by setting the skeleton of the body portion of the character as the first skeleton and setting the head portion of the character as the second skeleton, the movement of the second skeleton may be controlled according to the movement of the first skeleton. More specifically, by controlling the movement of the skeleton of the rear head portion according to the movement of the backbone, the polygon corresponding to the rear head may be prevented from intersecting the polygon of the back.

In particular, the object display processing of the present invention may be preferably used in an MMORPG. However, any other genres of game may be appropriately used as long as a plurality of characters is displayed on the display screen in the game. For example, the present invention may be preferably used in an action game or a shooting game.

The invention claimed is:

1. An object display device which displays a first object and a second object and in which positions of polygons are set in association with each of a position of a first skeleton of the first object and a position of a second skeleton of the second object, the object display device comprising:
   a display;
   a processor;
   a memory including a set of instructions that, when executed by the processor, causes the processor to perform operations including:
      activating the first skeleton;
      activating the second skeleton according to an activation of the first skeleton activated by the processor; and
      calculating a position of a polygon based on the position of the first skeleton and the position of the second skeleton, wherein the display displays the first object and the second object on a display screen by drawing the polygon at the position calculated by the processor, the second skeleton of the second object is in a fixed predetermined relationship with the first skeleton of the first object, the fixed predetermined relationship includes the second skeleton of the second object being parallel with the first skeleton of the first object, and further includes the second skeleton of the second object being offset a predetermined distance from the first skeleton of the first object, each point of the second skeleton satisfies the fixed predetermined relationship with the first skeleton, the operations further include:
determining that a distance between a first character, including the first skeleton of the first object and the second skeleton of the second object, and a second character is more than a predetermined threshold; and
cancelling a bone control flag in response to determining that the distance exceeds the predetermined threshold, and the second skeleton of the second object and the first skeleton of the first object have the fixed predetermined relationship in response to the bone control flag being cancelled.

2. The object display device according to claim 1, wherein
the first skeleton and the second skeleton are set to be substantially parallel to each other,
a position of a first polygon associated with the position of the first skeleton is set to be at a position that is substantially parallel to the first skeleton, and
a position of a second polygon associated with the position of the second skeleton is set to be at a position that is at a predetermined angle to the second skeleton.

3. The object display device according to claim 1, wherein the operations further include:
switching an activation method of activating the second skeleton from first processing when a predetermined condition is satisfied,
wherein, in the first processing, the processor activates the second skeleton by physics calculation processing regardless of the activation of the first skeleton.

4. The object display device according to claim 1, wherein an end of the second skeleton of the second object and an end of the first skeleton of the first object are connected to a third skeleton.

5. The object display device according to claim 1, wherein the second skeleton of the second object and the first skeleton of the first object have different lengths.

6. The object display device according to claim 1, wherein a length of the second skeleton of the second object is variable.

7. The object display device according to claim 1, wherein the operations further include:
calculating a first position of a first polygon associated with the first skeleton of the first object; and
calculating a second position of a second polygon associated with the second skeleton of the second object,
wherein the first position of the first polygon and the second position of the second polygon are not in the fixed predetermined relationship.

8. The object display device according to claim 7, wherein the first position of the first polygon is in the fixed predetermined relationship with the first skeleton of the first object and the second skeleton of the second object.

9. A non-transitory computer readable medium that stores an object display program which causes a computer apparatus to display a first object and a second object and in which positions of polygons are set in association with each of a position of a first skeleton of the first object and a position of a second skeleton of the second object,
the object display program causing the computer apparatus to perform operations including:
activating the first skeleton;
activating the second skeleton according to an activation of the first skeleton;
calculating a position of a polygon based on the position of the first skeleton and the position of the second skeleton; and
displaying the first object and the second object on a display screen by drawing the polygon at the calculated position,
wherein the second skeleton of the second object is in a fixed predetermined relationship with the first skeleton of the first object,
the fixed predetermined relationship includes the second skeleton of the second object being parallel with the first skeleton of the first object, and further includes the second skeleton of the second object being offset a predetermined distance from the first skeleton of the first object,
each point of the second skeleton satisfies the fixed predetermined relationship with the first skeleton,
the operations further include:
determining that a distance between a first character, including the first skeleton of the first object and the second skeleton of the second object, and a second character is more than a predetermined threshold; and
cancelling a bone control flag in response to determining that the distance exceeds the predetermined threshold, and
the second skeleton of the second object and the first skeleton of the first object have the fixed predetermined relationship in response to the bone control flag being cancelled.

10. The non-transitory computer readable medium according to claim 9, wherein a first polygon associated with the first skeleton is in the fixed predetermined relationship with the first skeleton and the second skeleton, and not in the fixed predetermined relationship with a second polygon associated with the second skeleton.

11. An object display method which executes a computer apparatus to display a first object and a second object and in which positions of polygons are set in association with a position of each of a first skeleton of the first object and a position of a second skeleton of the second object, the object display method comprising:
activating the first skeleton;
activating the second skeleton according to an activation of the first skeleton;
calculating a position of a polygon based on the position of the first skeleton and the position of the second skeleton; and
displaying the first object and the second object on a display screen by drawing the polygon at the calculated position,
wherein the second skeleton of the second object is in a fixed predetermined relationship with the first skeleton of the first object,
the fixed predetermined relationship includes the second skeleton of the second object being parallel with the first skeleton of the first object, and further includes the second skeleton of the second object being offset a predetermined distance from the first skeleton of the first object, each point of the second skeleton satisfies the fixed predetermined relationship with the first skeleton, the object display method further comprises:
  determining that a distance between a first character, including the first skeleton of the first object and the second skeleton of the second object, and a second character is more than a predetermined threshold; and
  cancelling a bone control flag in response to determining that the distance exceeds the predetermined threshold, and the second skeleton of the second object and the first skeleton of the first object have the fixed predetermined relationship in response to the bone control flag being cancelled.

12. The object display method according to claim 11, wherein a first polygon associated with the first skeleton is in the fixed predetermined relationship with the first skeleton and the second skeleton, and not in the fixed predetermined relationship with a second polygon associated with the second skeleton.

13. An object display system in which an operable object is allocated to each of object display devices that are connectable to each other, the object includes a first object and a second object, and positions of polygons are set in association with each of a position of a first skeleton of the first object and a position of a second skeleton of the second object, the object display system comprising:
  an other object display device comprising:
    an other communication interface that accepts other object operation information allocated to the other object display device, and that transmits the other object operation information; and
  an own object display device comprising:
    an own communication interface that receives the other object operation information from the other object display device;
    a processor;
    a memory including a set of instructions that, when executed by the processor, causes the processor to perform operations including:
      activating the first skeleton of the other object according to the other object operation information received by the own communication interface;
      activating the second skeleton of the other object according to an activation of the first skeleton activated by the processor; and
      calculating a position of a polygon of the other object based on the position of the first skeleton and the position of the second skeleton; and
    a display that displays the first object and the second object on a display screen by drawing the polygon at the position calculated by the processor, wherein the second skeleton is in a fixed predetermined relationship with the first skeleton, the fixed predetermined relationship includes the second skeleton of the second object being parallel with the first skeleton of the first object, and further includes the second skeleton of the second object being offset a predetermined distance from the first skeleton of the first object, each point of the second skeleton satisfies the fixed predetermined relationship with the first skeleton, the operations further include:
  determining that a distance between a first character, including the first skeleton of the first object and the second skeleton of the second object, and a second character is more than a predetermined threshold; and
  cancelling a bone control flag in response to determining that the distance exceeds the predetermined threshold, and the second skeleton of the second object and the first skeleton of the first object have the fixed predetermined relationship in response to the bone control flag being cancelled.

14. The object display system according to claim 13, wherein a first polygon associated with the first skeleton is in the fixed predetermined relationship with the first skeleton and the second skeleton, and not in the fixed predetermined relationship with a second polygon associated with the second skeleton.

* * * * *